Aug. 14, 1962    J. A. GLEW    3,049,251
COMMERCIAL CARRIER BULK UNLOADING DEVICE
Filed Nov. 17, 1960    2 Sheets-Sheet 1
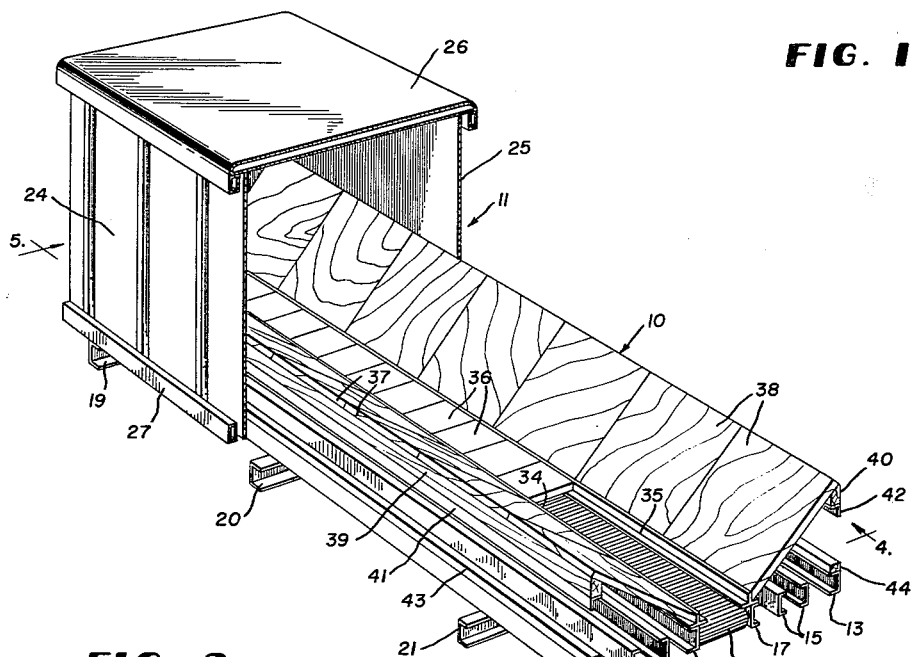
FIG. 1
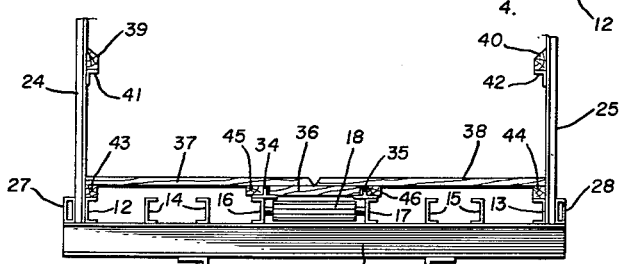
FIG. 2
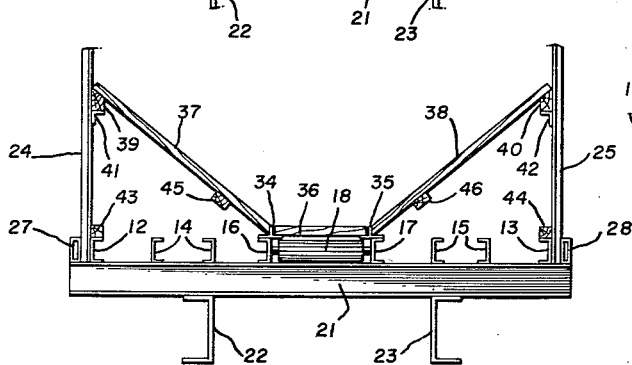
FIG. 3
FIG. 4
INVENTOR.
JOHN A. GLEW
BY L. S. Saulsbury
ATTORNEY Aug. 14, 1962  J. A. GLEW  3,049,251
COMMERCIAL CARRIER BULK UNLOADING DEVICE
Filed Nov. 17, 1960  2 Sheets-Sheet 2
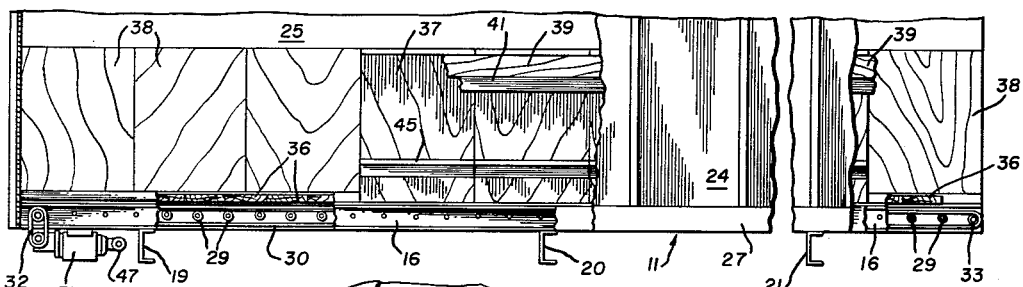
FIG. 5
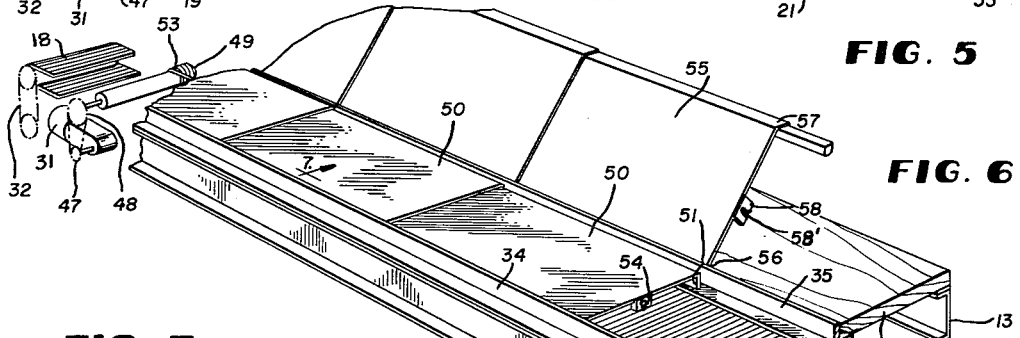
FIG. 6
FIG. 7
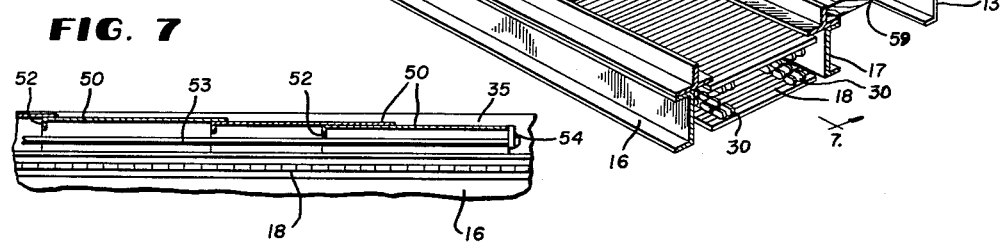
FIG. 8
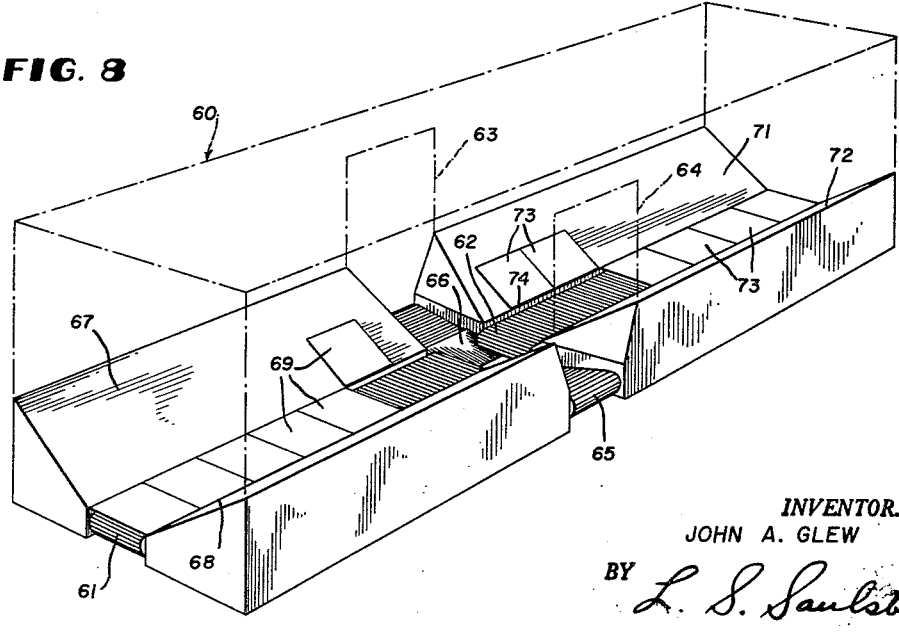
INVENTOR.
JOHN A. GLEW
BY L. S. Saulsbury
ATTORNEY

United States Patent Office 3,049,251
Patented Aug. 14, 1962

3,049,251
COMMERCIAL CARRIER BULK
UNLOADING DEVICE
John A. Glew, Presque Isle, Maine
(1001 3rd St. SW., Washington 24, D.C.)
Filed Nov. 17, 1960, Ser. No. 70,002
1 Claim. (Cl. 214—83.36)

This invention relates to commercial carriers and more particularly to a bulk unloading device therefor.

In recent years, there has been an increased interest in packaging vegetables and fruits at the terminal markets to which the vegetables or fruit has been brought in bulk, directly from the field or orchard. The transportation of these vegetables or fruit for this purpose has been done in large bags and boxes which are costly to transport because they consume much space. While this has eliminated the need for this smaller container and their cost, the handling and the care of the boxes which are not collapsible prevent the commercial carrier from having a back haul or return pay-load, thus the bulk handling of these vegetables and fruits has not reduced shipping costs. It has been found that many of these same vegetables and fruits lend themselves to bulk transportation as well as bulk storage and that the bulk box or bag is not actually necessary. Standard truck or freight cars unload these bulk vegetables and fruits at any terminal warehouse that is equipped to repackage these vegetables or fruits and can do so just as easily, if not more so, directly from the freight car or truck as from the large size bulk bags or boxes and without the necessity of the bulk bags or boxes having to be unloaded or handled. The entire bulk contents of a truck or freight car could be packaged in the same time or less than when the bulk containers are used, if convenient unloading devices can be provided in the truck or freight car for unloading the bulk vegetables or fruits in proper timing for filling the consumer packages.

It has accordingly been the principal object of the present invention to provide an unloading device for these commercial carriers, such as trucks and freight cars that lend the trucks or cars suitable for the packaging of the vegetables or fruits into the small consumer packs at the terminal warehouse.

It is another object of the invention to provide an unloading device for trucks or freight cars to handle bulk vegetables and fruits so that the discharge or unloading of the vegetables or fruits are delayed by the device within the car or truck and without jamming the small packaging equipment receiving the vegetables or fruit directly from the truck or car and to unload only small or sectionalized quantities of the bulk vegetables or fruit thereof at a time.

It is still another object of the invention to provide an unloading device for vegetable and fruit commercial carriers which, while adapted for the unloading of these vegetables and fruits, will consume little space in the truck or car and so that the truck or car is rendered suitable for a return back haul or pay-load and provide for a flat floor space such ordinarily had by the freight car or truck when unequipped with such a device and so as to accommodate other types of loads and without empty bulk boxes needing to be returned to the field.

It is still a further object of the invention to provide an unloading device for unloading bulk vegetables and fruits suitable for freight cars having opposing central door openings by which the bulk vagetables or fruit can be drawn from the separate ends of the freight car toward the center door opening, separately or simultaneously and with which there is provided a cross-conveyor that will receive the vegetables or fruits from end conveyors and convey the same to either side opening of the car and to the small consumer pack packaging equipment at the terminal warehouse.

It is still further object of the invention to provide a bulk vegetable or fruit unloading device for commercial trucks and freight cars in which the floor thereof need only to be heightened sufficiently to house conveyors and in which the bulk supports overlying the conveyor are removable or collapsible from one end of the carrier to the other as the bulk vegetables and fruits are removed from the carrier and either can be stored in one end of the truck or car space or they can be realtered over the conveyor so as to provide a flat floor bottom for the back haul purposes.

Other objects of the invention are to provide an unloading device for bulk vegetables and fruits in commercial carriers, having the above objects in mind, which is of simple construction, inexpensive to manufacture, light in weight, easy to install in the truck body or freight car, consumes little space, operated by motors in the confines of the unloading device or under the truck floor, unloads the car or truck automatically, eliminates repacking operations, increases the bulk weight and volume of the vegetables and fruits that can be carried over that which can be carried in containers, eliminates the weight of the containers, efficient and effective in use, and automatic in operation.

For still further objects and for a better understanding of the invention, reference may be had to the following detailed description taken in connection with the accompanying drawing, in which FIGURE 1 is a fragmentary perspective view of a trailer truck body having the unloading device of the present invention installed therein, FIG. 2 is a fragmentary end elevational view of the trailer truck body and of the unloading device with the bulk side supports lowered to cover the conveyor and to form the floor of the truck that may be used for the back haul load, FIG. 3 is a fragmentary end elevational view of the trailer truck body with the bulk side support elevated to their inclined positions and the unloading device conditioned for supporting and unloading the bulk vegetables and fruits.

FIG. 4 is a fragmentary vertical sectional view taken through the central conveyor at the point of location that the conveyor is uncovered and as viewed generally on line 4—4 of FIG. 1, FIG. 5 is a fragmentary longitudinal sectional view of the truck body as viewed generally on line 5—5 of FIG. 1, FIG. 6 is a fragmentary perspective view of a modified form of the invention which employs a telescopically-arranged conveyor cover for use over a conveyor and along the inclined sides to support the bulk load, FIG. 7 is a fragmentary longitudinal sectional view of the form of the invention shown in FIG. 6 and as viewed on line 7—7 thereof, and FIG. 8 is a perspective view of another modified form of the invention adapted for use in a rail freight car to remove the vegetables or fruits from the ends of the car and outwardly through either of the center door openings at the opposite sides of the car.

According to the present invention the trucks and the freight cars can be remodeled at a comparatively small cost to carry vegetables and fruits in bulk. The present unloading conveyor having lags, chains or belt, is built into floor racks of the truck or rail freight car without greatly increasing the floor height more than a few inches. The shipper loads the truck or rail car with bulk vegetables or fruit after making sure that the conveyor is covered by the central and side wood floor supports or metal telescoping slats. When the shipment is received at the terminal market or destination, a power motor mounted on the truck or car, or built into the unloading device is started to operate the conveyor and the vegetables or fruit are progressively discharged through the door openings. As sections of the vegetables or fruits are removed from the rail car or truck, the wood support or metal slats are lifted or slid from the conveyor to uncover it and cause consistent and even discharge feeding of the bulk vegetables or fruit to the packaging equipment at the terminal warehouse.

In the rail freight car, it is necessary to have three separate conveyors whereas in the truck body only the one conveyor is necessary that runs the entire length of the truck body. Thus, in the rail car there is provided one conveyor in each end of the car and a cross-conveyor extending therebetween to unload the vegetables and fruit through the side doorways. The truck and car bodies can be loaded by loading conveyors thrust through the door openings of the truck or car and adapted to be elevated and withdrawn as the loading operation proceeds. To effect the unloading the device has opposing inclined floor areas at the opposite sides of the truck or car so that vegetables or fruits such as potatoes are fed by gravity toward and onto the centrally disposed conveyors in the floor. Since the usual one hundred pound burlap bags or box containers are not used, twenty percent more potatoes by weight can be handled in this manner. The amount of damage to potatoes has been found to be greatly reduced. The other vegetables, such as onions, and fruits such as oranges, can be similarly handled. The potatoes flow out of car by gravity feeding onto conveyors. One freight car has been so unloaded with the present device at a terminal warehouse in less than one half hour. The vegetables or fruit are unloaded automatically directly into a hopper at a packing center.

Referring now to FIGURES 1 to 5, an unloading device according to the first form of the invention and indicated generally at 10 is provided in a trailer truck body 11. The trailer truck body 11 has the usual longitudinally-extending channel section side floor beams 12, 13, pairs of similar opposing bears 14, 15, conveyor beams 16, 17, running through the truck body and between the latter of which is a central conveyor 18 that operates as the bulk vegetables or fruit are delivered by gravity to it, discharges and unloads these vegetables and fruit through the door opening at the rear of the truck body. The channel section beams 12 to 17 are supported on heavy duty cross beams 19, 20 and 21 longitudinally-spaced from one another along the underside of the truck body and these being in turn on the main chassis beams 22 and 23, FIGS. 2 and 3. The vertically-ribbed side walls 24 and 25 of the truck body are secured respectively to the respective side beams 12 and 13 and extend upwardly to support a top structure 26. Bottom external beams 27 and 28 run along the outer sides of the walls 24 and 25 and upon the other ends of cross beams 19, 20 and 21 to hold the walls 24 and 25 against outward displacement at the bottom of the truck body and provide guards for the sides of the truck body.

Rotatably connected between the central channel section beams 16 and 17 between which, the conveyor 18 and extending therebetween, are conveyor idler supports 29 for the upper row of traveling conveyor slats, FIG. 4. The slats of the conveyor 18 are connected to drive chains 30 lying at opposite sides of the conveyor, FIGS. 4 and 6, and driven by an electric drive unit 31 at the forward end of the truck body and connected to a pulley drive 32 with appropriate drive rollers that are connected to the drive belts chains 30 to drive the same over the idler supports and an idler pulley 33 located at the rear of the truck body, FIG. 5.

Running respectively along the top edges of the conveyor beams 16 and 17 are respective inverted T-section runners 34 and 35 that are made secure to the beams 16 and 17 and which support, along their inner sides, removable wood conveyor cover plate supports 36 that cover the entire conveyor 18 for the purpose of the truck body being completely loaded with the bulk vegetables or fruit and to eliminate the jamming of the vegetables or fruit upon the conveyor when the conveyor is operated to unload them.

Extending upwardly from the opposite sides of the top T-section runners 34 and 35 are respectively inclined wood slats 37 and 38 that are supported respectively at their outer and upper ends upon wood runners 39 and 40 carried respectively by angle brackets 41 and 42 fixed to the inner sides of the vertically-ribbed side walls 24 and 25 of the truck body 11. The conveyor cover plate supports 36 and the inclined slats 37 and 38 are made of wood and are sufficiently light in weight so that they can be removed easily by hand one at a time as the unloading operation is carried out. With the conveyor cover plate supports 36 and the inclined side slats 37 and 38 in place as best seen in FIG. 1, the truck body can be loaded with the vegetables or fruit by any suitable means but preferably by a conveyor that can be extended into the open rear end of the truck and which can be elevated and retracted as the bulk vegetables or fruit build up in the truck, first in the forward end and then rearwardly until the truck has been filled to the door opening.

Upon the truck and its contents being taken to a terminal market where the unloading and packaging are to be effected, the truck doors are opened and the rearmost cover plate 36 is removed to expose the conveyor 18 so that the vegetables or fruit will fall by gravity upon the conveyor, down the inclined slats 37 and 38 as the conveyor is operated by the electric drive motor 31. The vegetables or fruit in the rear location of the truck up to a point or next cover plate 36 will be discharged into the hopper of the packaging equipment at the terminal warehouse. The inclined slats 37 and 38 are left in place throughout the entire unloading operation to keep the vegetables and fruit from falling through the truck floor beams.

When the truck has been finally unloaded the cover plate supports 36 are again disposed on the runners 34 and 35 to close off the conveyor 18. The floor of the truck body can now be arranged to take a non-bulk return pay load. The inclined slats 37 and 38 are placed over the conveyor cover plate support 36 as shown in FIG. 2 so that they rest at their outer ends on wood runners 43 and 44 lying upon the floor beams 12 and 13 at the opposite sides of the truck body. These side slats 37 and 38 are made of such length that their inner ends will join with one another over the conveyor cover plate supports so as to provide a floor surface independently thereof. The side slats 37 and 38 respectively have cleats 45 and 46 that support the inner ends of the slats upon the respective T-section runners 34 and 35. These side slats 37 and 38 now provide a flat floor bottom so that the truck can be used to haul a non-bulk return load consisting of cartons, boxes and the like that can be readily supported upon the slat floor bottom.

When the truck is again to be adapted for bulk vegetables or fruit, the side slats 37 and 38 are lifted at their outer ends and placed upon the wood runners 39 and 40 and their inner ends placed against the outer sides of the top runners 34 and 35 as shown in FIGS. 1 and 3. The truck body is again adapted for another haul of a bulk load of vegetables or fruit.

Referring now particularly to FIGS. 6 and 7, there is shown a modified form of the invention in which the conveyor cover supports and side slats are telescopically arranged. Instead of wood cover plate supports, there is provided a series of telescopically-fitted cover plate supports 50 made of thin metal and slidable one within the other and when rearwardly extended, adapted to overlie the complete conveyor 18 and to support the vegetables and fruit in bulk thereover. These slide-fitted cover plate supports 50 are made of thin metal and reinforced at their side edges by being turned down as indicated at 51 and their forward ends by a turned down flange 52. The turn down side edges 51 run respectively along the inner sides of the respective inverted T-shaped runners 34 and 35. As the vegetables or fruit, such as potatoes, are removed from the truck the cover plate supports 50 are pushed back and when the rear reinforcing flange 52 of the first cover support 50 engages the flange of the next cover support 50, the second or next cover support will also be removed forwardly and so on until all of the vegetables or fruit have been allowed to be lowered onto the conveyor 18 and will be completely discharged from the truck body. These telescopic plate supports 50 can be pushed by hand or can be pulled forwardly in the truck by a cable 53 detachably connected to a depending lug 54 on the rearmost cover plate support 50. The motor 31 has a controlled auxiliary change-speed reduction gear output 47 that is connected through a pulley drive 48 that drives a cable drum 49 that pulls cable 53. The reduction gear unit may be timed to give proper retraction of the cover plates 53 to effect the continuous discharge of the bulk vegetables or fruits. The delay of the discharge can be effected by detaching the end of the cable 53 from the lug 54 in the rear cover plate 50.

Instead of the inclined side slats being of wood, they also are formed of telescopically-slidable metal slats 55 having bent reinforcing side edge flanges 56 and 57 and one slat slidable within the other slat from the rear of the truck forwardly. The rearmost telescopic inclined side slats 55 have a depending lug 58 on their rear edge to which the cable 53 can be detachably fixed in the slat 58' thereof, and the motor 31 that operates the conveyor 18 and the cable drum 49 can retract the side slats 50 or this may be done by hand. For this purpose, the reduction gear may be set to its high speed. The bulk vegetables and fruit will have fell by gravity from the inclined side slats 55 onto the conveyor 18.

The turned down edge flanges 56 are held against the vertical portion of the runners 34 or 35 by a board 99 which is supported upon the runners 34 or 35 and upon the channel-shaped floor runners as best seen in FIG. 6. These boards 59 provide the floor bottom for the back haul with the slats 55 having been retracted completely forwardly and telescoped upon one another and left in the forward end of the truck. The conveyor cover plates 50, after the unloading operation has been effected, can be pulled forwardly by hand and in cooperation with the floor boards 58 provide the full slat floor for the return pay-load of cartons, boxes and the like.

In FIG. 8, there is shown a freight or rail car 60 applying the unloading devices of the present invention. For a rail car, where the unloading is effected through the opposite side openings of the rail car intermediate its length, there are provided, instead of one single conveyor as employed in truck, three such conveyors, two conveyors 61 and 62 running respectively from the opposite end of the car toward the center of the car and a cross-conveyor 65 extending from the discharge ends of the conveyors 61, 62 to the door openings 63 and 64, and adapted to be operated in one direction or the other to discharge the bulk vegetables or fruit delivered or allowed to pile up on an apron 66 from the conveyors 61 and 62 and carry it to either door opening 63 or 64 depending on the direction the conveyor 65 is traveling.

In order to feed the bulk vegetables or fruit to the conveyor 61, there are provided at the opposite sides of the conveyor 61 opposing inclined side walls 67 and 68 extending downwardly from the respective opposite sides of the car 60 to the sides of the conveyor and by which the bulk vegetables or fruit are directed to fall by gravity to the conveyor 61 when it is exposed as by lifting sectionalized cover plate supports 69 one at a time beginning with the first one at the center of the rail car to allow the vegetables or fruit to fall onto the exposed conveyor 61.

Extending upwardly from the sides of the conveyor 62 at the opposite end of the rail car are inclined opposing side walls 71 and 72. The bulk vegetables or fruit while supported upon cover plate supports 73 extend across the conveyor 62 at the lower edges of the inclined walls 71 and 72. These cover plates 73 may be hinged at their lower edges to one of the side walls as indicated at 74 and simply lifted up from the opposite side and allowed to rest upon the face of the inclined side wall 71. As all of these cover plate supports 69 and 73 are lifted, the contents of the car are brought to the center and deposited upon the center apron 66 and picked up by the cross conveyor 65 to discharge the vegetables or fruit through either the car door opening 63 or 64 depending upon the direction which the cross conveyor 65 is operated.

As with the truck body described above, the conveyors are operated by electric motors suitably disposed on the rail car. Likewise, the conveyors can be supported and secured to the car floor structure either over or within the same in any expedient manner. The rail car 60 will be loaded with the bulk vegetables or fruit by extending a loading conveyor into the ends of the rail car and elevating and retracting the same as the vegetables or fruit pile up on the conveyor cover plate supports and side walls.

It should now be apparent that there has been provided an automatic unloading device for trucks and rail cars that will automatically unload the truck or car or to the full extent thereof without the requirement of container or bags for the handling of the vegetables and fruit. By simply removing the sectionalize conveyor cover plate supports one at a time as the unloading operation progresses, the commercial carrier is quickly unloaded and made ready for a return haul. It will also be apparent that the construction is such that the inclined slats can be extended over the conveyor in horizontal positions and used to make up the flat floor to permit a return non bulk pay-load.

While various changes may be made in the detail construction, it shall be understood that such changes shall be within the spirit and scope of the present invention as defined by the appended claim.

What is claimed is:

An unloading device for trucks and rail cars for removing bulk vegetables or fruit therefrom comprising a central conveyor running longitudinally through the truck or car body in the floor thereof, inclined supports extending respectively upwardly from the opposite sides of the conveyor to the sides of the truck or car body and from which the vegetables and fruits may fall by gravity onto the conveyor, conveyor cover plate supports removably placed along the conveyor and between the lower edges of the inclined supports and which may be removed one at a time to expose the conveyor to unload the bulk vegetables or fruit, said conveyor cover plate supports being telescopically fitted into one another and adapted to be extended the total length of the conveyor and to be telescopically collapsed as the unloading operation is effected, an electrical motor drive means connected to the conveyor to operate the same, cable drive means adapted to be operated by the same electric motor drive means connected to the rearmost cover plate support simultaneously with the operation of the motor to telescope the conveyor cover plate supports whereby the entire bulk load may be automatically discharged, said inclined side supports also being telescopically fitted into one another and collapsible into one end of the truck or rail car, said cable drive means being detachably connected to the rearmost cover plate conveyor support and to the rearmost of the inclined side supports whereby the same cable means may be used either for collapsing the conveyor cover plate supports or the inclined side supports.

References Cited in the file of this patent

UNITED STATES PATENTS

| | | |
|---|---|---|
| 720,124 | Ferguson | Feb. 10, 1903 |
| 1,692,782 | Mackin | Nov. 20, 1928 |
| 1,928,859 | Kutscha | Oct. 3, 1933 |
| 1,974,293 | Surdy | Sept. 18, 1934 |
| 2,637,456 | Felderman | May 5, 1953 |
| 2,663,439 | Phelps | Dec. 22, 1953 |
| 2,668,629 | Dahlman | Feb. 9, 1954 |
| 2,828,028 | Sullenbarger et al. | Mar. 25, 1958 |
| 2,850,089 | Burke | Sept. 2, 1958 |